US011853149B2

(12) United States Patent
Shah et al.

(10) Patent No.: US 11,853,149 B2
(45) Date of Patent: Dec. 26, 2023

(54) GENERATING ERROR EVENT DESCRIPTIONS USING CONTEXT-SPECIFIC ATTENTION

(71) Applicant: International Business Machines Corporation, Armonk, NY (US)

(72) Inventors: Anjali Shah, Short Hills, NJ (US); Jennifer A. Mallette, Vienna, VA (US); Salim Roukos, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 17/471,258

(22) Filed: Sep. 10, 2021

(65) Prior Publication Data

US 2023/0084422 A1  Mar. 16, 2023

(51) Int. Cl.
| | |
|---|---|
| *G06F 11/00* | (2006.01) |
| *G06F 11/07* | (2006.01) |
| *G06F 40/205* | (2020.01) |
| *G06F 40/284* | (2020.01) |
| *G06F 11/22* | (2006.01) |

(52) U.S. Cl.
CPC ...... *G06F 11/0769* (2013.01); *G06F 11/2263* (2013.01); *G06F 40/205* (2020.01); *G06F 40/284* (2020.01)

(58) Field of Classification Search
CPC .......................... G06F 11/0769; G06F 11/2263
USPC ...................................................... 714/1–57
See application file for complete search history.

(56) References Cited

U.S. PATENT DOCUMENTS

| | | | |
|---|---|---|---|
| 7,373,552 B2 | 5/2008 | Björsne | |
| 8,499,280 B2 | 7/2013 | Davies | |
| 9,348,687 B2 | 5/2016 | Boger | |
| 9,495,233 B2 | 11/2016 | McNairy | |
| 9,652,318 B2 | 5/2017 | Namkoong | |
| 10,235,227 B2 | 3/2019 | Purushothaman | |
| 10,474,519 B2 | 11/2019 | Talwadker | |
| 10,614,085 B2 | 4/2020 | Chakra | |
| 10,614,398 B2 | 4/2020 | Chakra | |
| 10,693,711 B1 | 6/2020 | Garg | |
| 10,831,588 B2 | 11/2020 | Qiao | |
| 11,625,294 B2* | 4/2023 | Bramble | G06F 11/0787 714/2 |
| 2003/0204804 A1* | 10/2003 | Petri | G06F 11/0706 712/E9.082 |
| 2004/0078689 A1* | 4/2004 | Knuutila | G06F 11/366 714/38.1 |

(Continued)

OTHER PUBLICATIONS

Mell et al., "The NIST Definition of Cloud Computing", National Institute of Standards and Technology, U.S. Department of Commerce, NIST Special Publication 800-145, Sep. 2011, 7 pages.

(Continued)

*Primary Examiner* — Sarai E Butler
(74) *Attorney, Agent, or Firm* — David K. Mattheis

(57) ABSTRACT

Generating error event descriptions by receiving a set of error messages associated with an error event, generating a tokenization of at least one line of the set of error messages, providing the tokenization to an attention head according to a context of the tokenization, providing an output of the attention head as input to a generative model, generating a description of the error event according to the output, and providing the description to a user.

17 Claims, 9 Drawing Sheets

(56) References Cited

U.S. PATENT DOCUMENTS

| | | | | |
|---|---|---|---|---|
| 2004/0078724 A1* | 4/2004 | Keller | ............... | G06F 30/398 |
| | | | | 714/48 |
| 2005/0188269 A1* | 8/2005 | El-Shimi | ............ | G06F 11/3604 |
| | | | | 714/38.14 |
| 2008/0244325 A1* | 10/2008 | Tyulenev | ............. | G06F 11/362 |
| | | | | 714/E11.212 |
| 2009/0044055 A1* | 2/2009 | Wang | ................ | G06F 11/0748 |
| | | | | 714/27 |
| 2013/0145222 A1* | 6/2013 | Birdsall | ................. | G06F 9/542 |
| | | | | 714/48 |
| 2020/0007474 A1 | 1/2020 | Zhang | | |
| 2020/0112574 A1* | 4/2020 | Koral | ................... | G06F 16/245 |
| 2022/0161423 A1* | 5/2022 | Perez | .................... | B25J 9/1664 |

OTHER PUBLICATIONS

Vaswani et al., "Attention is all you need", arXiv:1706.03762v5 [cs.CL] Dec. 6, 2017, 15 pps., <https://arxiv.org/abs/1706.03762>.

Wu et al., "A Graph-Based Method For Programming Language Syntax Error Correction", ICPC '20: Proceedings of the 28th International Conference on Program Comprehension, Jul. 2020, pp. 139-148, <https://dl.acm.org/doi/epdf/10.1145/3387904.3389252>.

Wyrich et al., "Towards an Autonomous Bot For Automatic Source Code Refactoring", BotSE '19: Proceedings of the 1st International Workshop on Bots in Software Engineering, May 2019, pp. 24-28, <https://dl.acm.org/doi/epdf/10.1109/BotSE.2019.00015>.

* cited by examiner

GENERATING ERROR EVENT DESCRIPTIONS USING CONTEXT-SPECIFIC ATTENTION

BACKGROUND

The disclosure relates generally to the machine learning-based generation of error event descriptions. The disclosure relates particularly to machine learning-based generation of error event descriptions in support of an integrated development environment (IDE).

Current technical chatbot support can help configure service for mundane IT tasks such as account provisioning/de-provisioning, password help, hooking up to issue resolution system, creating support tickets to defer issues to human agents, and the like.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable error event description generation.

Aspects of the invention disclose methods, systems and computer readable media associated with generating error event descriptions by receiving a set of error messages associated with an error event, generating a tokenization of at least one line of the set of error messages, providing the tokenization to an attention head according to a context of the tokenization, providing an output of the attention head as input to a generative model, generating a description of the error event according to the output, and providing the description to a user.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
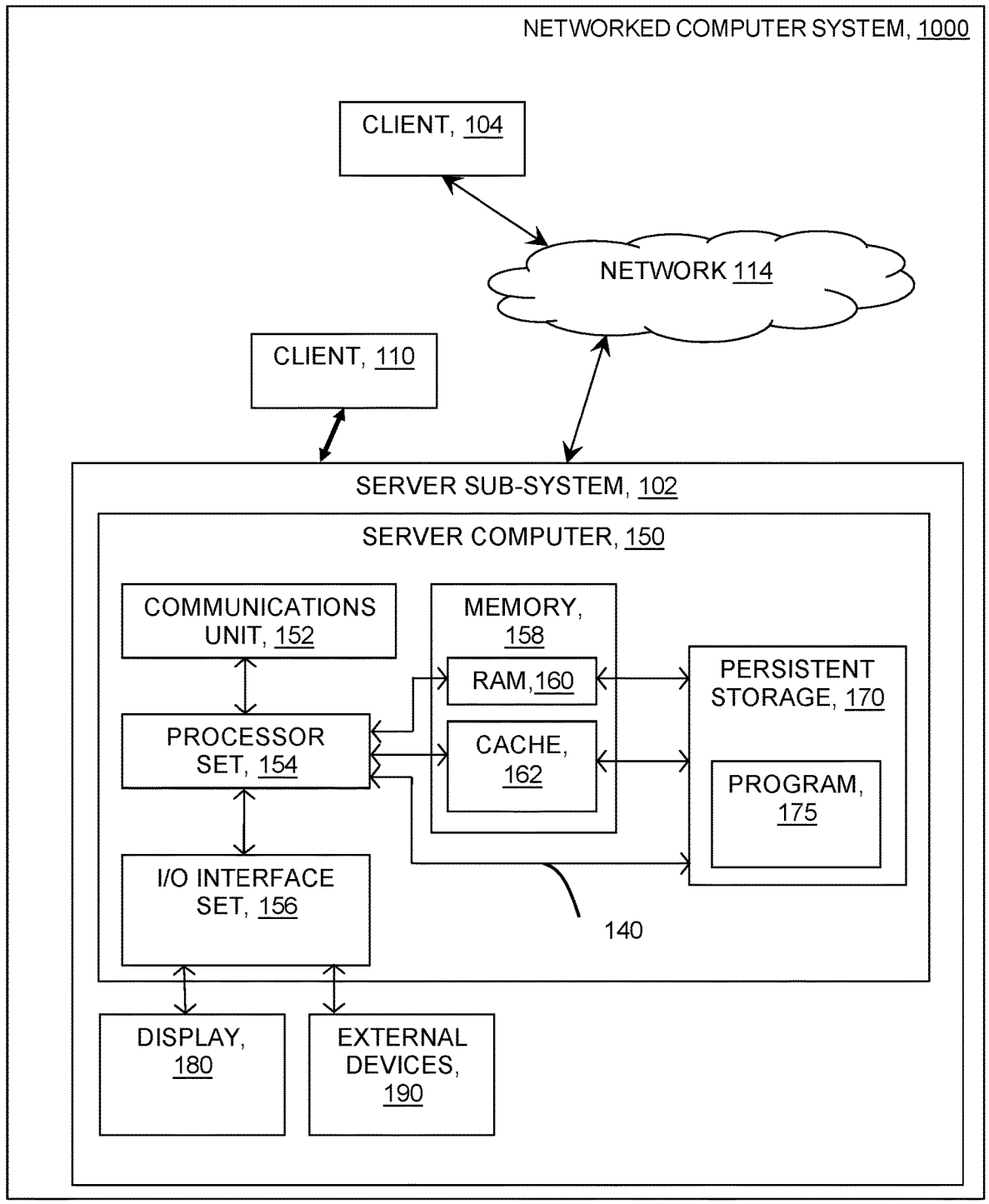
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

For complex tasks that require deep technical skills, there's a gap between the capabilities of current chatbot applications and the needs of users. Disclosed embodiments provide a chatbot using conversational AI to understand the problem, perform an intelligent search to look for a solution, and suggest an appropriate solution in the conversational thread. When unable to find a solution, the chatbot logs the problem as a skills gap for later training and defers the issue to a human agent for closing the loop.

When resolving programming errors, technical professionals spend most of their time understanding the stack trace of the error message. Disclosed embodiments focus on expediting this process by helping the technical professional understand the crux of the error message. Disclosed methods provide a chatbot integrated into the development environment that is actively scanning for error events. Upon error event occurrence, the chatbot parses the stack trace of the error message using context-specific attention mechanisms to gather details such as line number of program code responsible for error origination, variables involved, and the error description. A pre-trained, generative, language model-based global attention head combines these details from the context-specific attention heads to generate a user-friendly conversational description of the error message, along with other information from its knowledge base that helps expedite resolution of the programming errors.

Programming errors are integral to application development process. Disclosed embodiments expedite the error resolution process through automating explanation of error events and outlining the steps needed to resolve the errors with a conversational dialogue. This helps accelerate the application development timeline.

Aspects of the present invention relate generally to chatbot systems and, more particularly, to conversational assistance with coding errors in integrated development environments. In embodiments, a chatbot system receives an error indication and an error stack trace message from a user device, determines error context from the stack trace, and returns a generated conversational output including the error context as well as additional information related to the error identified from the context. According to aspects of the invention, the chatbot system automatically eliminates extraneous portions of the stack trace, extracts relevant data from the lines of the stack trace, retrieves stored data associated with an identified error and generates a conversational response for the user. The chatbot system receives follow up questions from the user regarding the output and continually builds its knowledge store regarding potential errors and useful responses to those errors. In this manner, implementations of the invention learn and continually adjust their relevant knowledge store such that the chatbot system returns answers helping users quickly resolve and eliminate coding errors.

In accordance with aspects of the invention there is a method for automatically generating conversational outputs relevant to current coding errors, the method comprising:

receiving an error message including a multi-line stack trace for the error, parsing the multi-line message and eliminating extraneous lines of the message, tokenizing the remaining lines to determine a context for each remaining line, e.g., line number, variable, error description, passing the tokenization for each remaining line to a context specific attention head for evaluation, passing the combined outputs of multiple attention heads to a global language generator and passing the generated conversational output of the global language generator to the user of the system.

Aspects of the invention provide an improvement in the technical field of chatbot systems. Conventional chatbot systems utilize static models when deciding what answer to provide to a question posed by a user. In many cases, users do not have data in advance that tells them what a relevant error-based question is. Implementations of the invention parse the system error message, determine contexts for relevant portions of the message, and generate a response related to the identified error contexts including suggested next steps relevant to identified errors and retrieved from the system's knowledge store. This provides the improvement of identifying the location and nature of the coding error for the user as well as providing useful information regarding how to resolve the error.

Aspects of the invention also provide an improvement to computer functionality. In particular, implementations of the invention are directed to a specific improvement to the way chatbot systems operate, embodied in the parsing of the stack trace message and the evaluation of lines of the message using context specific attention heads to extract data relevant to generating a conversational output to assist the user in identifying and resolving the current coding error. In embodiments, the system determines a context for each relevant line of the stack trace and passes each line to a specific attention head according to the identified context for that line. The separate attention heads extract specific data from the stack trace lines and pass the combined data portions to a generative model where generation of a conversational message related to the current error and based upon the extracted data occurs. The method passes the generated message to the user and engages the user in further conversation related to resolving the error.

As an overview, a chatbot system is an artificial intelligence application executed on data processing hardware that generates natural language answers pertaining to a given subject-matter input data. The chatbot system receives inputs from various sources including input over a network, a corpus of electronic documents or other data, data from a content creator, information from one or more content users, and other such inputs from other possible sources of input. Data storage devices store the corpus of data. A response generator creates responses according to the trained model and the received input data. For example, a chatbot system accesses a body of knowledge about the domain, or subject matter area (e.g., error messages for specific programming languages, etc.) where the body of knowledge (knowledgebase) can be organized in a variety of configurations, such as but not limited to a structured repository of programming language-specific information, such as known error message descriptions and typical resolutions to such error messages.

In an embodiment, one or more components of the system can employ hardware and/or software to solve problems that are highly technical in nature (e.g., receiving a set of error messages associated with an error event, generating a tokenization of at least one line of the set of error messages, providing the tokenization to an attention head according to a context of the tokenization, providing an output of the attention head as input to a generative model, generating a description of the error event according to the output, providing the description to a user, etc.). These solutions are not abstract and cannot be performed as a set of mental acts by a human due to the processing capabilities needed to facilitate error event resolution, for example. Further, some of the processes performed may be performed by a specialized computer for carrying out defined tasks related to error event resolution. For example, a specialized computer can be employed to carry out tasks related to resolving error events, or the like.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise error event evaluation program (not shown) together with sufficient computing resource (processor, memory, network communications hardware) to execute the program. Client devices 104 and 110 represent user interface devices for a user of the IDE to enter code in the IDE and to engage the chatbot of the disclosed embodiments regarding code error events. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the error event description generation program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., error event description generation program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer to provide the user with a display of entered code and the ongoing code error conversation with chatbots of the disclosed inventions.

Figure 2:
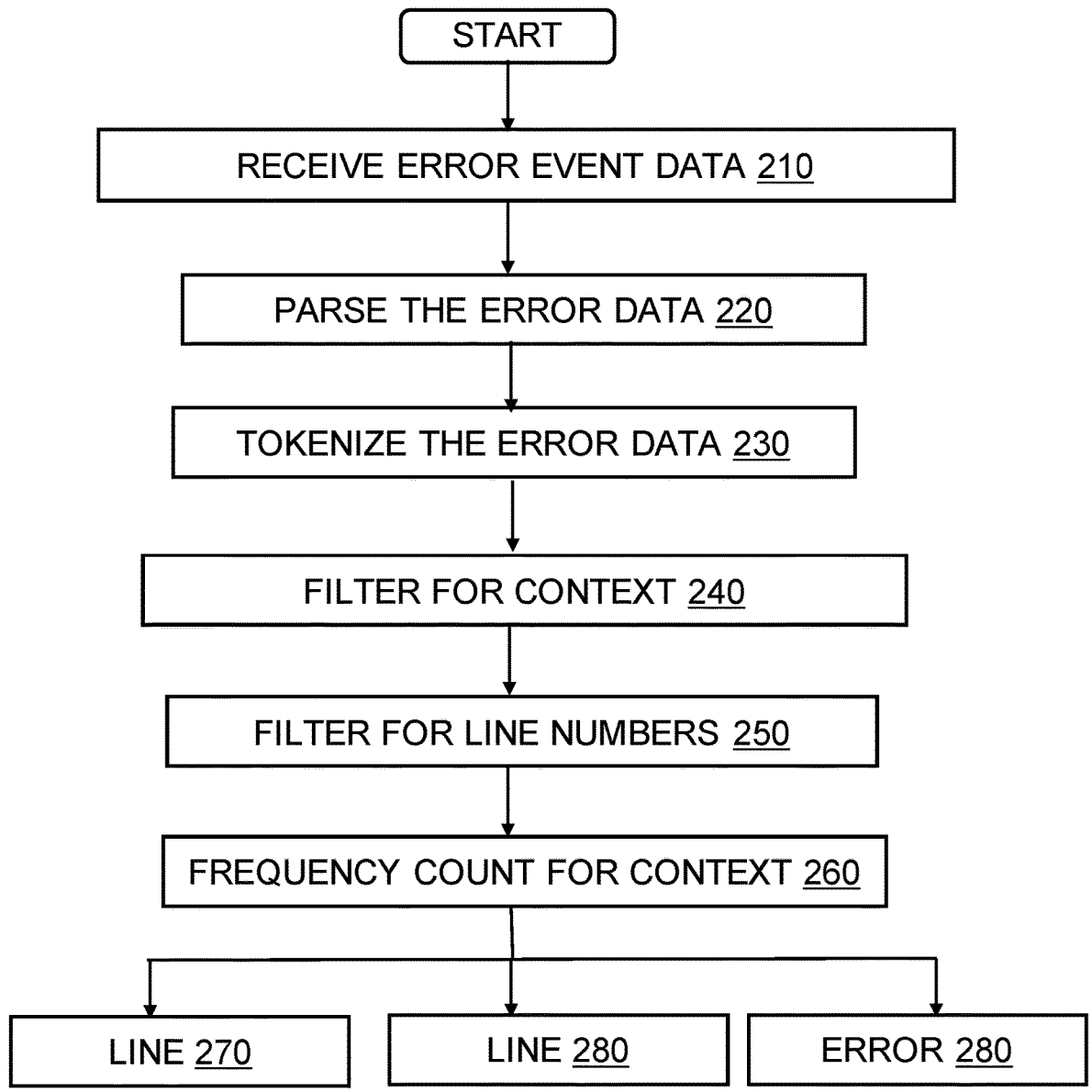
FIG. 2 provides a flowchart depicting data tokenization and dispatch to respective attention heads, according to an embodiment of the invention.

Referring to FIG. 2, in an embodiment, a user initiates use of the chatbot system and method at block 210. After initiation, the system and method begins scanning the IDE of the user and detects an error event having an associated stack trace error message. The method and system receive the stack trace for the error event. In this embodiment, at block 220, the method parses the stack trace and considers each line of the message individually. For each line the method tokenizes the line at block 230, such as by breaking the line into individual words for languages such as English, French, or German, or individual characters.

In this embodiment, at block 240, the method filters the stack trace lines and drops lines which do not reference line numbers, variables, or error event descriptions, from further consideration and processing. Similarly, at block 250, the method further filters the stack trace lines and drops lines which reference line numbers outside the scope of the error event evaluator, such as lines pertaining to code from imported libraries, from further consideration. At block 260, the method applies token frequency counting to the tokens of the remaining lines to determine the relevant context, e.g., line, variable, or error description (error) of the remaining lines.

The tokenization of each of the remaining lines is then passed to the appropriate attention head of the system for further processing—the identification of the specific line, variable, and error description contained in the tokenization of the stack trace line. Those stack trace lines with frequency counts indicating the presence of relevant line numbers are passed to the line attention head at block 270. Those with frequency counts indicating variables are passed to the variable attention head at block 280, and those with frequency counts indicating error codes or other error descriptions, are passed to the error attention head at block 290.

In an embodiment, the method further processes the stack trace lines using one or more weighted linear transformation functions to transform the original line tokenizations to vectors having a common dimension. The vectors output from the linear transformation functions are then passed to the context specific attentions described below. In an embodiment, the vectors have a consistent dimensionality due to the linear transformation functions.

Figure 3:
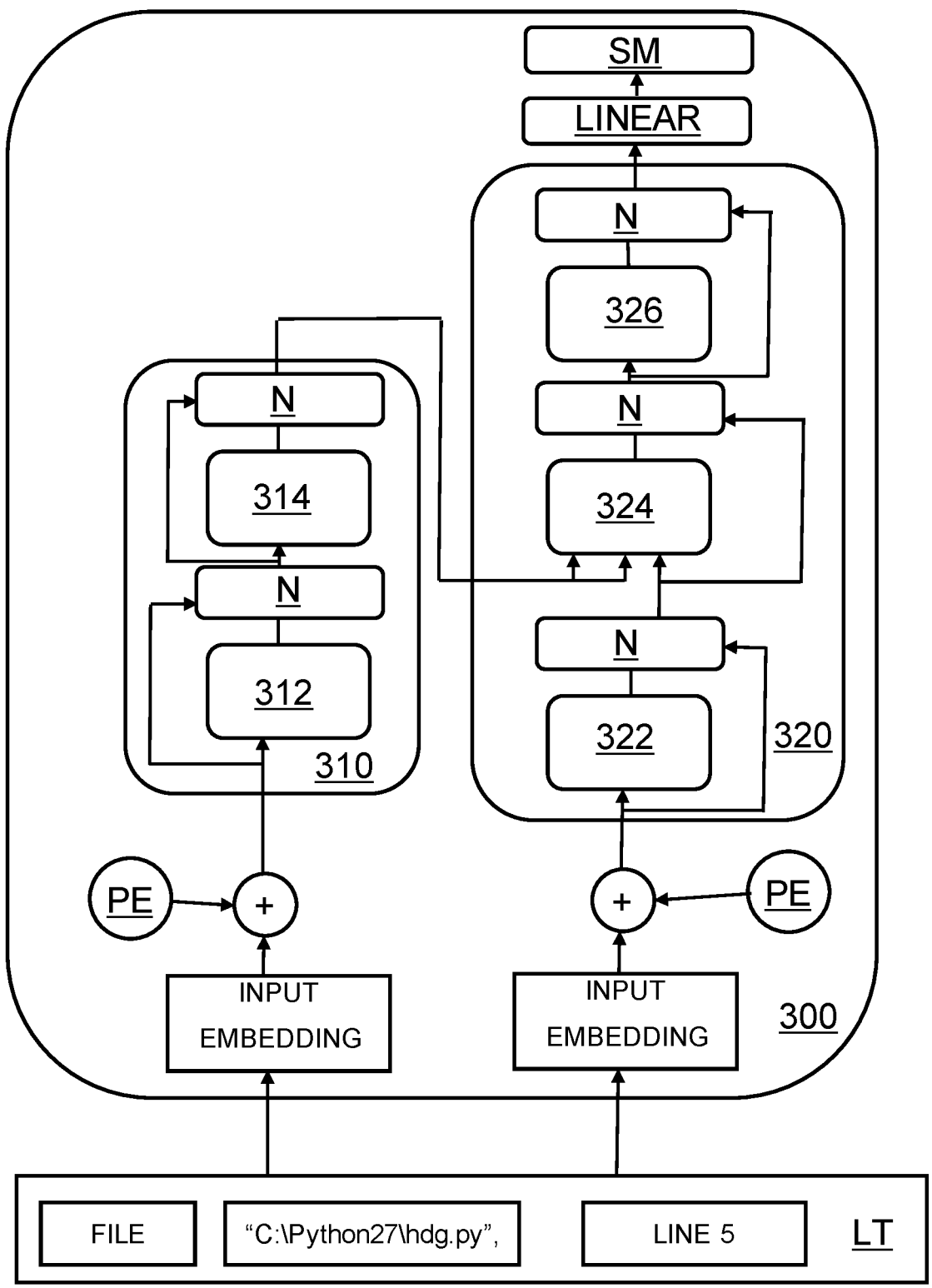
FIG. 3 provides a functional block diagram of line-based attention, according to an embodiment of the invention.

FIG. 3 illustrates the functionality of a line attention head. In an embodiment, use of particular architecture for the attention heads benefits from including information in the input regarding the relative positioning of the respective tokens for the stack trace line. To that end, the method defines positional information, such as positional information for the dimensions of the token embedding of the stack trace line, according to a positional function for the different dimensions, such as using sine and cosine functions to define positional data for each element of the input tokenization. In an embodiment, each context specific attention head includes an encoder-decoder architecture. As shown in the Figure, the method passes the stack trace line tokenization LT together with the determined positional information PE, for the tokenization, to each of the encoder 310, and decoder 320, modules of line attention head 300. The encoder 310, uses a multi-head attention 312, and feed forward logic 314, as one block stacked 6 times, to go through the line tokenization from the stack trace. On the decoder 320, side, the set-up is similar to encoder 310, with the addition of a line-specific attention block 322, that looks to extract out the line number information as the decoder output. The method then combines the line-based attention output and encoder 310 output as input to a similar six block structure with a multi-head attention 324, and feed forward logic 326, as that used by the encoder 310.

In an embodiment, the encoder is composed of a stack of identical layers, such as six identical layers. Each layer has a multi-head self-attention head 312, sub-layer, and a position-wise fully connected feed-forward network 314, sub-layer. The encoder also includes a connection around each of the multi-head attention and the feed-forward network. The output of each sub-layer is normalized.

In this embodiment, the decoder is also composed of a stack of six identical layers. Each decoder layer further includes a context specific attention head in addition to the two sub-layers described above. The decoder outputs are also normalized. Each of the encoder and decoder receives an identical embedding of the contextually relevant tokenization.

In an embodiment, the attention heads comprise a scaled dot product attention function between words of the sentence to quantify relationships between them. Also, the attention head uses multiple attention functions in parallel and is therefore a multi-head attention. This allows the model to jointly attend to different representation subspaces at different positions.

In an embodiment, the feed forward network comprises a neural network applying two linear transformations with a rectified linear unit (ReLU) activation in between to inject non-linearity.

In an embodiment, the output from the decoder passes to a linear transformation function LINEAR, which generates an input for a SoftMax function SM. The output of the SoftMax function SM passes to a global attention head and the generative language model.

In an embodiment, the linear transformation function comprises the same function and function weights used to transform the contextual embedding from the input tokenization into a vector of the desired dimensions. Here the linear transformation transforms the decoder output into a vector of the same dimensions.

In an embodiment, the SoftMax function turns the vector output of the linear transformation function to a normalized probability distribution of the next token prediction according to the underlying corpus of the system and method.

Figure 4:
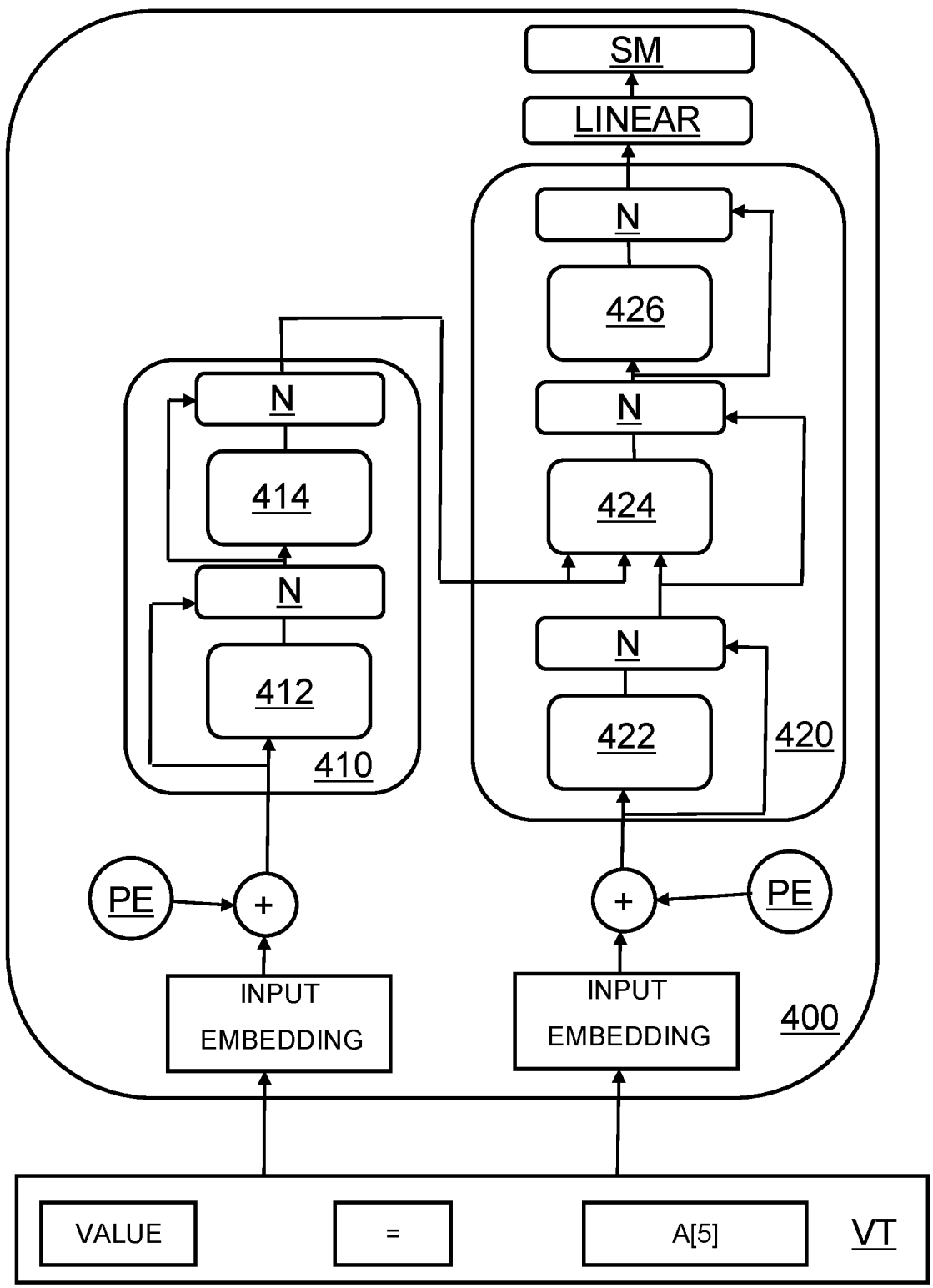
FIG. 4 provides a functional block diagram of error-based attention, according to an embodiment of the invention.

FIG. 4 illustrates the functionality of a variable attention head. In an embodiment, use of particular architecture for the attention heads benefits from including information in the input regarding the relative positioning of the respective tokens for the stack trace line. To that end, the method defines positional information, such as positional information for the dimensions of the token embedding of the stack trace line, according to a positional function for the different dimensions, such as using sine and cosine functions to define positional data for each element of the input tokenization. As shown in the Figure, the method passes the stack trace line tokenization LT together with the determined positional information PE, for the tokenization, to each of the encoder 410, and decoder 420, modules of variable attention head 400. The encoder 410, uses a multi-head attention 412, and feed forward logic 414, as one block repeated and stacked 6 times, to go through the variable tokenization from the stack trace. On the decoder 420, side, the set-up is similar to encoder 410, with the addition of a variable-specific attention block 422, that looks to extract out the variable information as the decoder output. The method then combines the variable-based attention output and encoder 410 output as input to a similar six block structure with a multi-head attention 424, and feed forward logic 426, as that used by the encoder 410.

In an embodiment, the encoder is composed of a stack of identical layers, such as six identical layers. Each layer has a multi-head self-attention head 412, sub-layer, and a position-wise fully connected feed-forward network 414, sub-layer. The encoder also includes a connection around each of the multi-head attention and the feed-forward network. The output of each sub-layer is normalized by a normalization function N.

In this embodiment, as a non-limiting example, the decoder is also composed of a stack of six identical layers. Each decoder layer further includes a context specific attention head in addition to the two sub-layers described above. The decoder outputs are also normalized. The decoder also includes connections around each of the context specific attentions, the multi-head attention, and the feed forward network to normalization functions. Each of the encoder and decoder receives an identical embedding of the contextually relevant tokenization.

In an embodiment, the output from the decoder passes to a linear transformation function LINEAR, which generates an input for a SoftMax function SM. The output of the SoftMax function SM passes to a global attention head and the generative language model.

Figure 5:
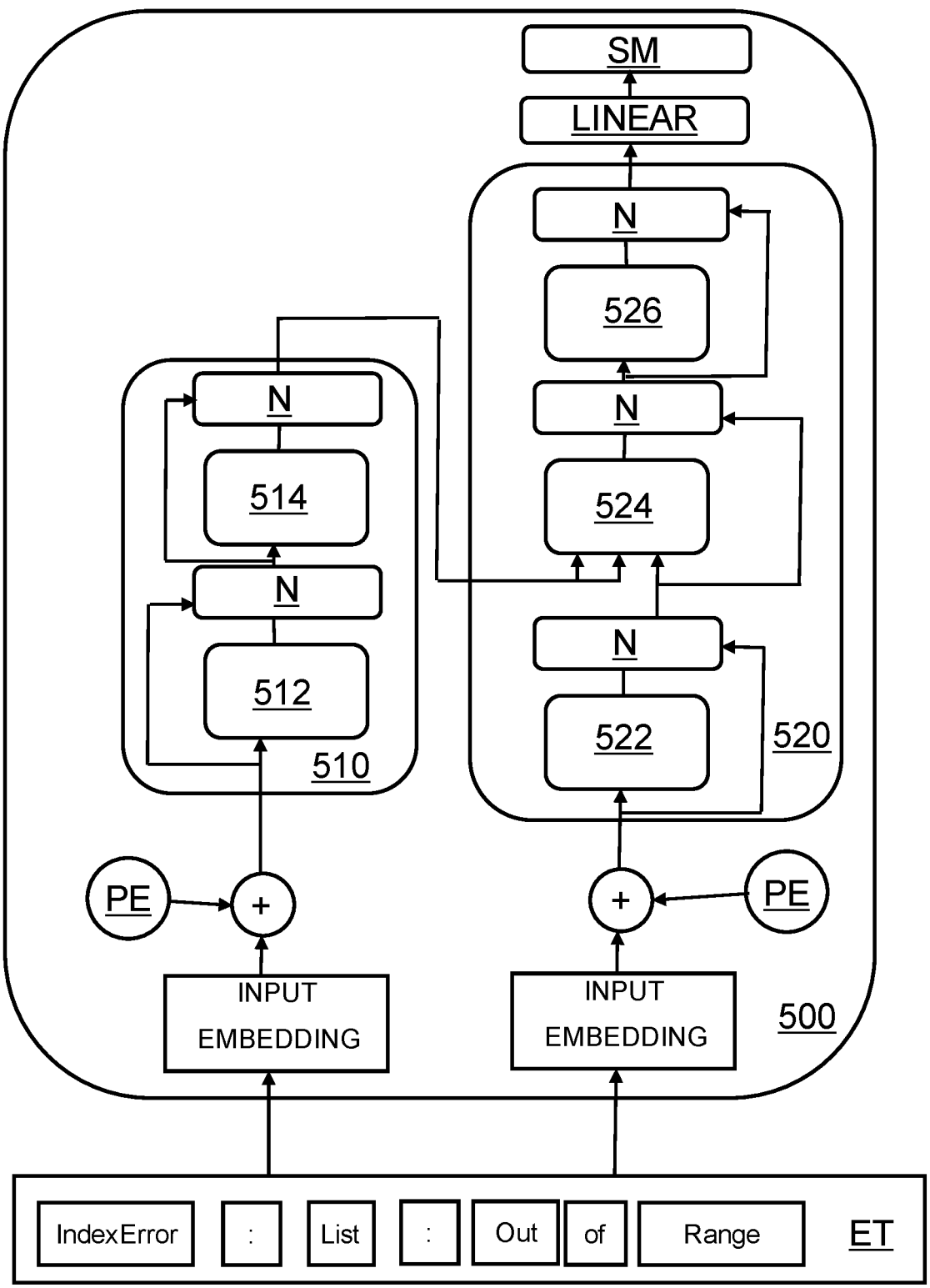
FIG. 5 provides a functional block diagram of variable-based attention, according to an embodiment of the invention.

FIG. 5 illustrates the functionality of an error attention head. In an embodiment, use of particular architecture for the attention heads benefits from including information in the input regarding the relative positioning of the respective tokens for the stack trace line. To that end, the method defines positional information, such as positional information for the dimensions of the token embedding of the stack trace line, according to a positional function for the different dimensions, such as using sine and cosine functions to define positional data for each element of the input tokenization. As shown in the Figure, the method passes the stack trace error tokenization ET, together with the determined positional information PE, for the tokenization, to each of the encoder 510, and decoder 520, modules of error attention head 500. The encoder 510, uses a multi-head attention 512, and feed forward logic 514, as one block repeated and stacked 6 times, to go through the error tokenization from the stack trace. On the decoder 320, side, the set-up is similar to encoder 510, with the addition of a error-specific attention block 522, that looks to extract out the error description information as the decoder output. The method then combines the error-based attention output and encoder 510 output as input to a similar six block structure with a multi-head attention 524, and feed forward logic 526, as that used by the encoder 510.

In an embodiment, the encoder is composed of a stack of identical layers, such as six identical layers. Each layer has a multi-head self-attention head 512, sub-layer, and a position-wise fully connected feed-forward network 514, sub-layer. The encoder also includes a connection around each of the multi-head attention and the feed-forward network. The output of each sub-layer is normalized by normalization function N.

In this embodiment, as a non-limiting example, the decoder is also composed of a stack of six identical layers. Each decoder layer further includes a context specific attention head in addition to the two sub-layers described above. The decoder outputs are also normalized. The decoder also includes connections around each of the context specific attentions, the multi-head attention, and the feed forward network to normalization functions. Each of the encoder and decoder receives an identical embedding of the contextually relevant tokenization.

In an embodiment, the output from the decoder passes to a linear transformation function LINEAR, which generates an input for a SoftMax function SM. The output of the SoftMax function SM passes to a global attention head and the generative language model.

Figure 6:
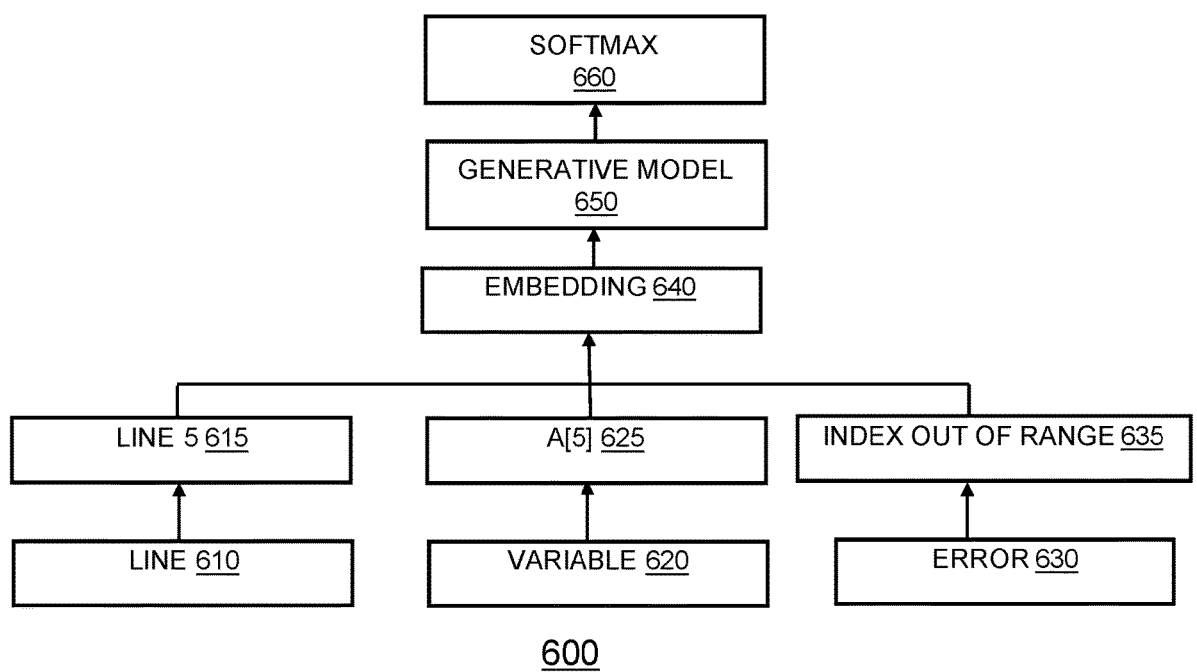
FIG. 6 provides a block diagram of combined attention heads and a generative language model, according to an embodiment of the invention.

FIG. 6 illustrates the global attention head 600, which receives and combines the outputs of the line, variable and error attention heads. The global attention head utilizes a trained generative model, such as a GPT-3 model, to generate a conversational output based upon the received line, variable and error outputs. As shown in the Figure, each context specific attention 610, 620, 630, provides a specific output 615, 625, and 635. The three respective outputs are combined in an input vector embedding 640 which the method provides as input to the generative model 650. Generative model 650 outputs a number of potential conversational responses based upon the context dependent inputs. The method passes the set of outputs and the corresponding generative model confidence levels for each output to a SoftMax function 660, which outputs probabilities of words from the knowledge corpus of the model used to form a conversational language message for the system user. In an embodiment, the method then provides the output having the highest confidence score to the user in response to the error event. In an embodiment, the method passes the generated output to a trained question answering system (not shown) for generation of specific answers relating to the identified error issues. In this embodiment, training the question answering system includes providing the system training regarding known error for different programming languages such that the trained model may retrieve data related to identified errors in the generated response.

In an embodiment, the user engages the chatbot program in response to the generated error description and suggested path forward. In this embodiment, the method processes the user's response to the generated error description and updates the generative model using the output embedding from the processing of the user response.

Figure 7:
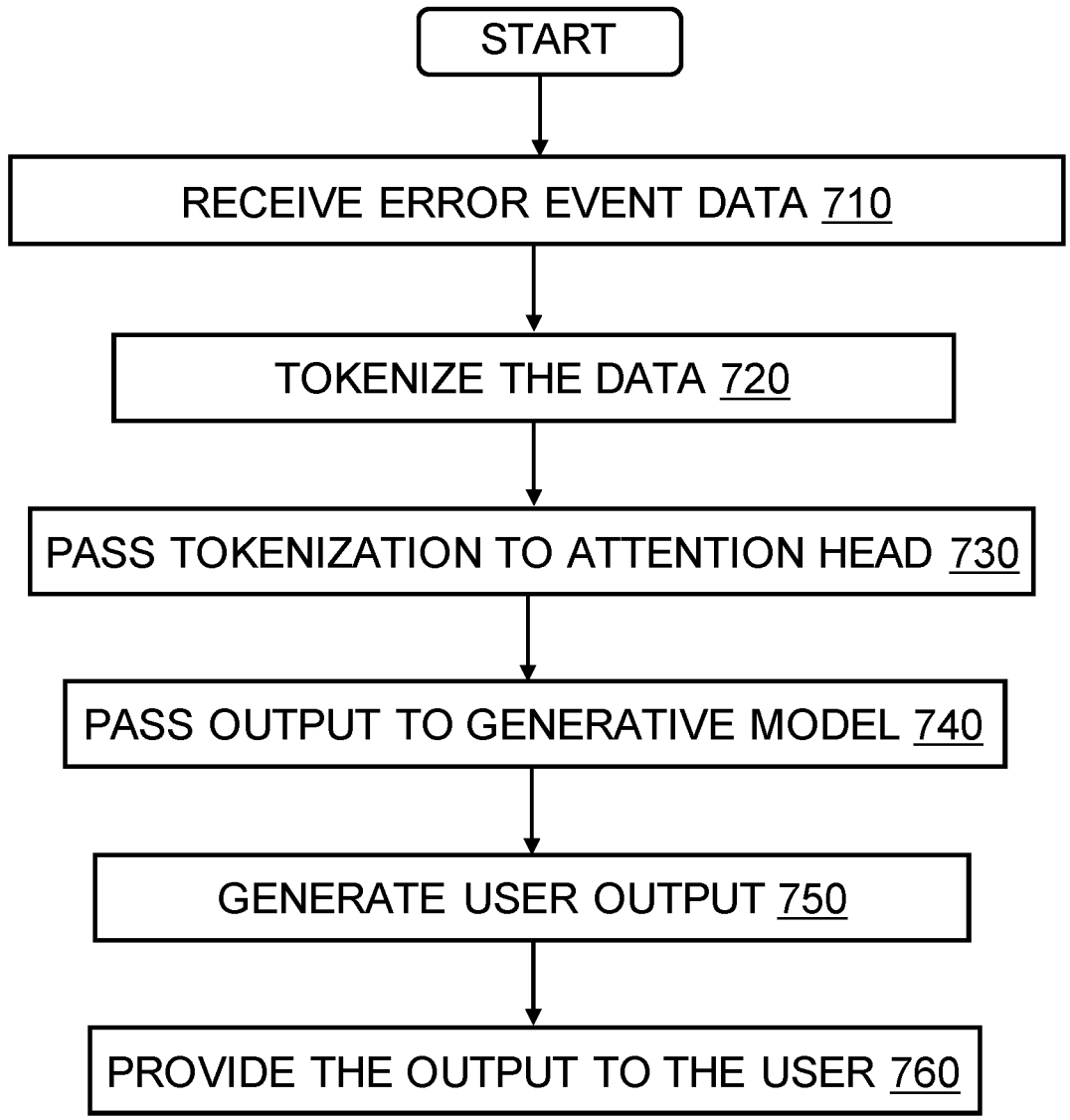
FIG. 7 provides a flowchart depicting an operational sequence, according to an embodiment of the invention.

FIG. 7 provides a flowchart 700, illustrating exemplary activities associated with the practice of the disclosure. After program start, at block 710, error event description generator program 175 receives error event data, such as stack trace data for an IDE error event. The program parses the error data into individual lines and filters the lines discarding those unrelated to line numbers, variables, or error descriptions, as well as discarding those lines relating to lines outside the scope of the program—such as lines associated with imported libraries of code.

At block 720 the method generates tokenization embedding vectors for each remaining line. The method performs a frequency count on the tokenizations to determine a context for each line, e.g. line, variable, or error.

At block 730, the method passes the embedded tokenization to a contextually relevant attention head—line to line etc., for further processing. The attention head extracts the specific contextual details from the input embedding as its output. For example, line 5, variable A[5], or error description list_index_out_of_range.

At block 740, the method provides the output of the attention head to a generative model, such as GPT-3 model. The generative language model generates a conversational output response based upon the contextual output from the specific attention head. In an embodiment, the method provides multiple attention head outputs associated with a single stack trace input, to the generative language model yielding a conversational output based upon the set of provided inputs.

At block 750 the method provides the generated response to the user in association with the current error event. In an embodiment, the method passes the generated response to a question answering system which generates a conversational response specific to the identified error of the generated output. In this embodiment, the generated question answering output provides the user with an indication of steps to take to resolve the current error.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
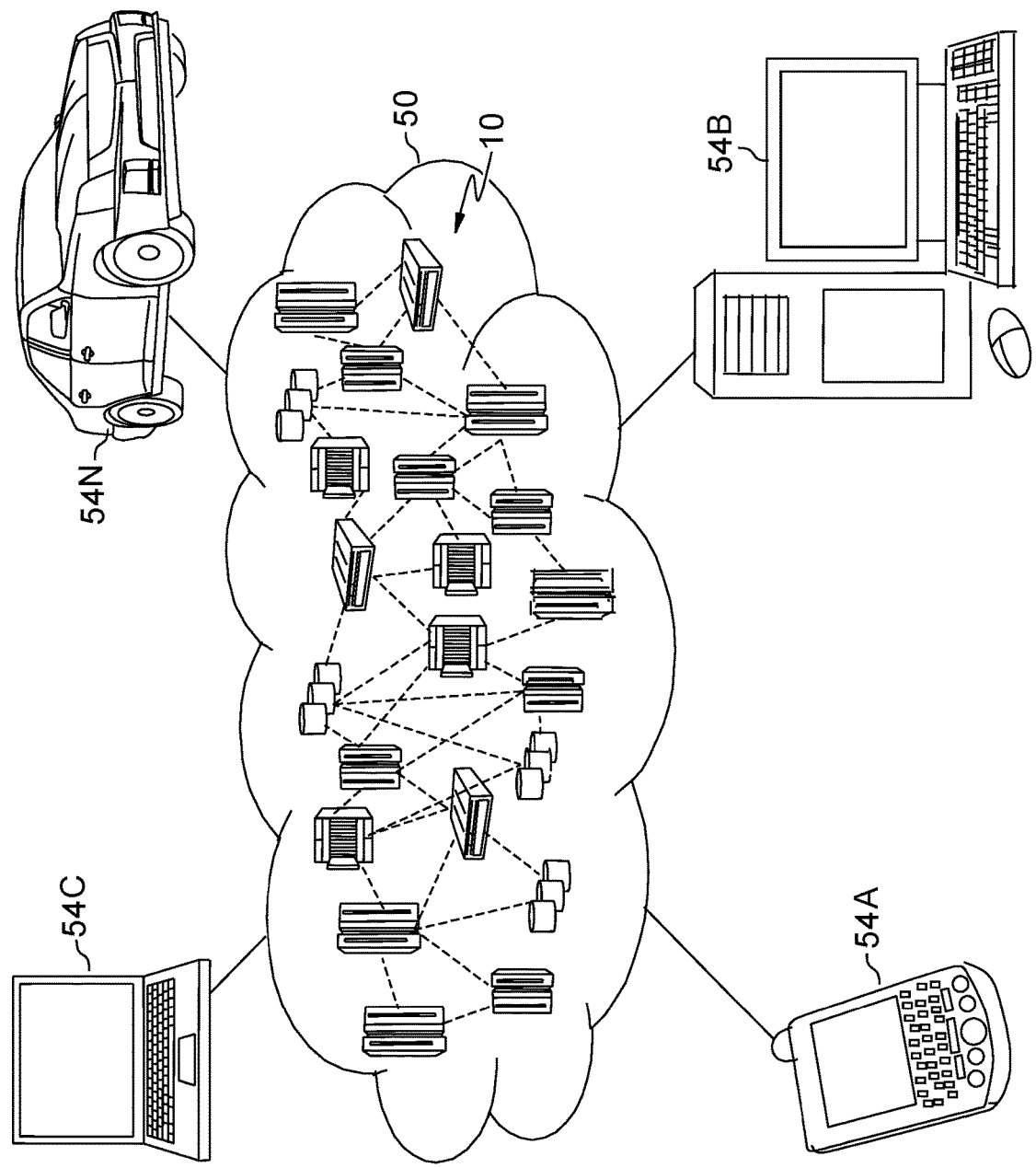
FIG. 8 depicts a cloud computing environment, according to an embodiment of the invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
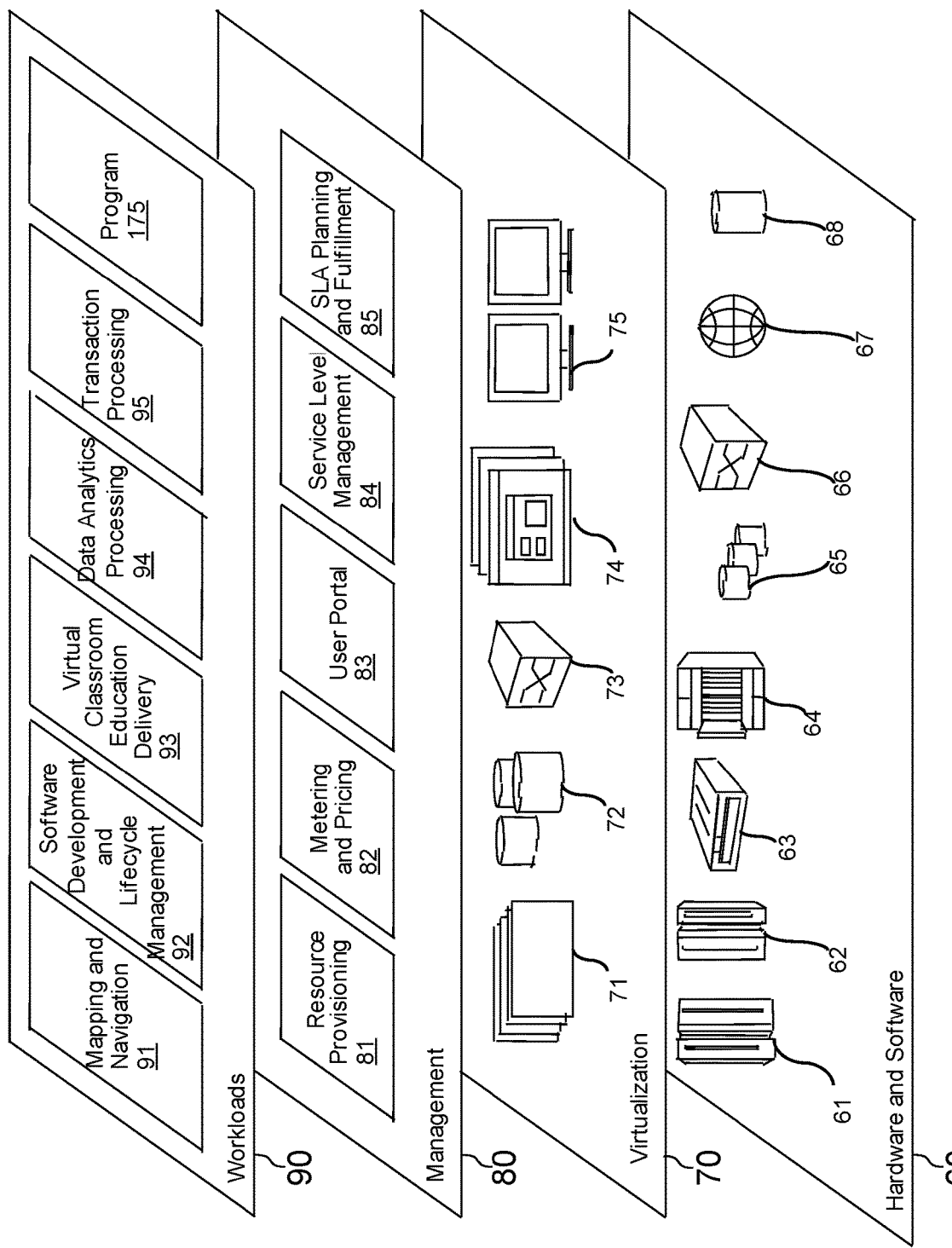
FIG. 9 depicts abstraction model layers, according to an embodiment of the invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and error event description generation program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for generating error event descriptions, the method comprising:
   receiving, by one or more computer processors, a set of error messages associated with an error event;
   generating, by the one or more computer processors, a tokenization of at least one line of the set of error messages;
   generating, by the one or more processors, a vector from the tokenization using a linear transformation;
   defining, by the one or more processors, positional information for each element of the tokenization;

providing, by the one or more computer processors, the vector and positional information of the tokenization to an encoder-decoder attention head according to a context of the tokenization;

providing, by the one or more computer processors, an output of the attention head as input to a generative model;

generating, by the one or more computer processors, a description of the error event according to the output; and providing, by the one or more computer processors, the description to a user.

2. The computer implemented method according to claim 1, wherein the set of error messages comprises a stack trace of the error event.

3. The computer implemented method according to claim 1, wherein the context includes an element selected from the group consisting of: line based attention, variable based attention, and error based attention.

4. The computer implemented method according to claim 1, further comprising filtering, by the one or more computer processors, the set of error messages according to error message context.

5. The computer implemented method according to claim 1, further comprising:
passing, by the one or more computer processors, the description to a question answering system; and
providing, by the one or more computer processors, an answer from the question answering system to the user, wherein the answer is associated with the description.

6. The computer implemented method according to claim 1, further comprising:
determining a context according to the tokenization.

7. A computer program product for generating error event descriptions, the computer program product comprising one or more computer readable storage devices and collectively stored program instructions on the one or more computer readable storage devices, the stored program instructions comprising program instructions to:
receive a set of error messages associated with an error event;
generate a tokenization of at least one line of the set of error messages;
generate a vector from the tokenization using a linear transformation;
define positional information for each element of the tokenization;
provide the vector and positional information of the tokenization to an encoder-decoder attention head according to a context of the tokenization;
provide an output of the attention head as input to a generative model;
generate a description of the error event according to the output; and
provide the description to a user.

8. The computer program product according to claim 7, wherein the set of error messages comprises a stack trace of the error event.

9. The computer program product according to claim 7, wherein the context includes an element selected from the group consisting of: line-based attention, variable based attention, and error based attention.

10. The computer program product according to claim 7, the stored program instructions further comprising program instructions to filter the set of error messages according to the context.

11. The computer program product according to claim 7, the stored program instructions further comprising program instructions to:
pass the description to a question answering system; and
provide an answer from the question answering system to the user, wherein the answer is associated with the description.

12. The computer program product according to claim 7, the stored program instructions further comprising program instructions to:
determine the context according to the tokenization.

13. A computer system for generating error event descriptions, the computer system comprising:
one or more computer processors;
one or more computer readable storage devices; and
stored program instructions on the one or more computer readable storage devices for execution by the one or more computer processors, the stored program instructions comprising program instructions to:
receive a set of error messages associated with an error event;
generate a tokenization of at least one line of the set of error messages;
generate a vector from the tokenization using a linear transformation;
define positional information for each element of the tokenization;
provide the vector and positional information of the tokenization to an encoder-decoder attention head according to a context of the tokenization;
provide an output of the attention head as input to a generative model;
generate a description of the error event according to the output; and
provide the description to a user.

14. The computer system according to claim 13, wherein the set of error messages comprises a stack trace of the error event.

15. The computer system according to claim 13, wherein the context includes an element selected from the group consisting of: line-based attention, variable based attention, and error-based attention.

16. The computer system according to claim 13, the stored program instructions further comprising program instructions to filter the set of error messages according to the context.

17. The computer system according to claim 13, the stored program instructions further comprising program instructions to:
pass the description to a question answering system; and
provide an answer from the question answering system to the user, wherein the answer is associated with the description.

* * * * *